(12) United States Patent
Herndon et al.

(10) Patent No.: US 9,115,758 B2
(45) Date of Patent: Aug. 25, 2015

(54) SHIELD RESTRICTING AXIAL MOVEMENT

(75) Inventors: Troy M. Herndon, San Jose, CA (US); James S. Lee, San Jose, CA (US); Jeffry A. Leblanc, Aptos, CA (US); Robert A. Nottingham, Santa Cruz, CA (US); Norbert S. Parsoneault, Scotts Valley, CA (US); Thaveesinn Vasavakul, Watsonville, CA (US); James S. Bowdoin, Aptos, CA (US); Christopher M. Woldemar, Santa Cruz, CA (US); Jerry J. Weingord, Scotts Valley, CA (US)

(73) Assignee: Seagate Technology LLC, Cupertino, CA (US)

( * ) Notice: Subject to any disclaimer, the term of this patent is extended or adjusted under 35 U.S.C. 154(b) by 95 days.

(21) Appl. No.: 13/478,078

(22) Filed: May 22, 2012

(65) Prior Publication Data

US 2012/0319516 A1 Dec. 20, 2012

Related U.S. Application Data

(63) Continuation of application No. 11/097,050, filed on Apr. 1, 2005, now Pat. No. 8,181,348.

(60) Provisional application No. 60/558,823, filed on Apr. 1, 2004.

(51) Int. Cl.
*H02K 5/15* (2006.01)
*F16C 33/10* (2006.01)
*H02K 5/167* (2006.01)
*F16C 41/00* (2006.01)

(52) U.S. Cl.
CPC ............. *F16C 33/103* (2013.01); *F16C 41/008* (2013.01); *H02K 5/1677* (2013.01); *Y10T 29/49009* (2015.01); *Y10T 29/49639* (2015.01); *Y10T 29/49702* (2015.01); *Y10T 29/49703* (2015.01); *Y10T 29/53443* (2015.01)

(58) Field of Classification Search
CPC ...... F16C 33/1045; F16C 35/10; F16C 32/06; F16C 33/74; B12D 53/10
USPC ............................. 310/88, 90, 400, 402, 417
See application file for complete search history.

(56) References Cited

U.S. PATENT DOCUMENTS

| | | | | |
|---|---|---|---|---|
| 5,957,589 | A * | 9/1999 | Lee et al. | 384/112 |
| 6,118,620 | A * | 9/2000 | Grantz et al. | 360/99.08 |
| 6,322,252 | B1 * | 11/2001 | Grantz et al. | 384/124 |
| 6,447,949 | B2 * | 9/2002 | Iwata et al. | 429/185 |
| 6,583,952 | B1 * | 6/2003 | Grantz et al. | 360/99.08 |
| 2002/0053846 | A1 * | 5/2002 | Le et al. | 310/90.5 |
| 2003/0190100 | A1 * | 10/2003 | Grantz et al. | 384/119 |
| 2003/0235353 | A1 * | 12/2003 | Nottingham et al. | 384/110 |
| 2004/0032175 | A1 * | 2/2004 | Grantz et al. | 310/90 |
| 2005/0015791 | A1 * | 1/2005 | Herndon et al. | 720/695 |

* cited by examiner

Primary Examiner — Tran Nguyen

(57) ABSTRACT

In one example, an FDB motor having a shield member is provided. In one example, the method includes disposing a first member and a second member for relative rotation about an axis of rotation. An annular shield member is attached to the first member, the shield member disposed adjacent a fluid reservoir for containing a bearing fluid. The reservoir is filled through an aperture (e.g., a fill hole) in the shield member. Thereafter, the aperture is at least partially sealed. The aperture may be hermetically sealed via one or more laser pulses. In other examples, a two piece shield is provided for shielding a reservoir without a fill hole.

20 Claims, 5 Drawing Sheets

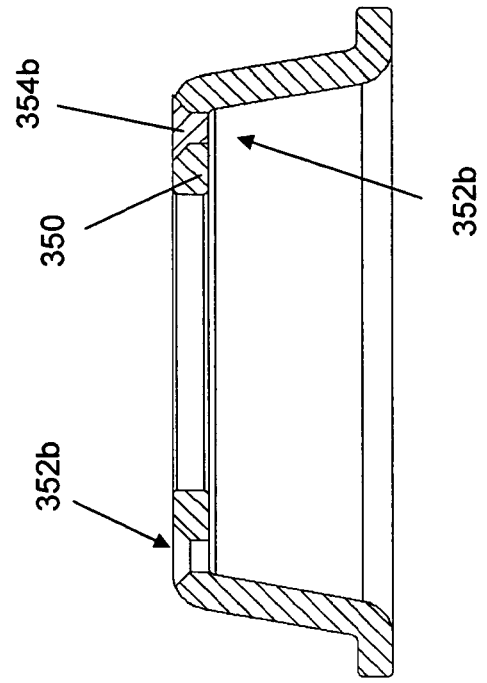
FIG. 3a
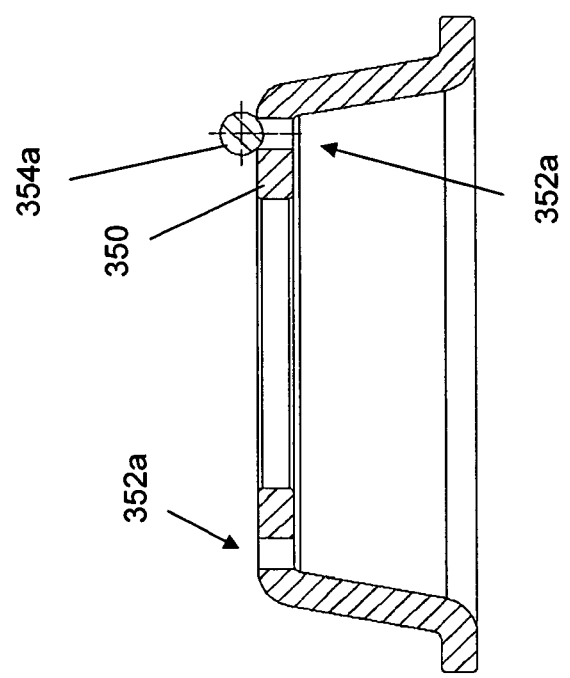
FIG. 3b
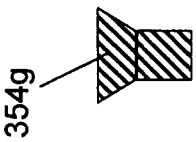
FIG. 3c
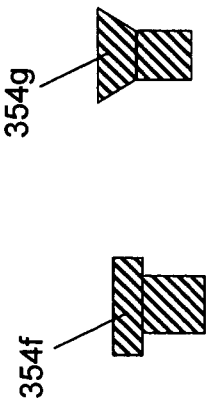
FIG. 3d
FIG. 3e
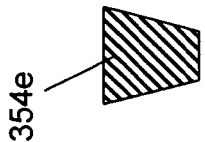
FIG. 3f
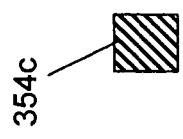
FIG. 3g

SHIELD RESTRICTING AXIAL MOVEMENT

RELATED APPLICATIONS

The present application is related to and claims benefit of priority from U.S. Provisional Patent Application No. 60/558,823, filed on Apr. 1, 2004, which is incorporated herein by reference in its entirety.

CROSS-REFERENCE TO RELATED APPLICATION

This application is a continuation of application Ser. No. 11/097,050, filed Apr. 1, 2005, which claims the benefit of U.S. Provisional Application No. 60/558,823, filed Apr. 1, 2004.

BACKGROUND

1. Field

Various examples described herein relate generally to methods and devices for shielding reservoirs of Fluid Dynamic Bearing (FDB) motors, and in particular methods and systems for reducing or preventing the loss of liquid within FDB motors.

2. Description of Related Art

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft and a hub, to which one or more disks are attached, and a sleeve defining a bore for the shaft. Permanent magnets attached to the hub interact with a stator winding to rotate the hub and disk. In order to facilitate rotation, one or more bearings are usually disposed between the sleeve and the shaft.

Over the years, storage density has tended to increase, and the size of the storage system has tended to decrease. This trend has lead to greater precision and lower tolerance in the manufacturing and operating of magnetic storage disks. Accordingly, the bearing assembly that supports the hub and storage disk is of increasing importance.

One typical bearing assembly used in such storage systems includes a fluid dynamic bearing system. In a fluid dynamic bearing system, a lubricating fluid such as air or liquid provides a bearing surface between a fixed member of the housing and a rotating member of the disk hub. In addition to air, typical lubricants include gas, oil, or other fluids. Fluid dynamic bearings spread the bearing surface over a large surface area, as opposed to a ball bearing assembly, which comprises a series of point interfaces. This is desirable because the increased bearing surface reduces wobble or runout between the rotating and fixed members. Further, the use of fluid in the interface area imparts damping effects to the bearing, which helps reduce non-repeatable run-out.

To keep the lubricating liquid in the bearing region, the bearing system generally includes various sealing mechanisms, such as capillary seals for retaining the lubricating liquid in the bearing region during non-operation of the motor. A capillary seal typically comprises two relatively angled surfaces at the end of the fluid dynamic bearing gap containing the bearing region(s) and utilizes capillary forces to bias the fluid toward the bearing region(s).

The fluid dynamic bearing motor, and in particular, the capillary seals, may lose fluid over time to evaporation or if subject to sudden jarring, often referred to as a shock event. Accordingly, motors including fluid dynamic bearings typically include a fluid reservoir adapted to contain additional fluid for the bearings that is lost, e.g., due to evaporation over the life of the motor or during a shock event. Often, the fluid reservoir is part of or at least in fluidic communication with a capillary seal.

Fluid within the capillary seal and reservoir may be contained or sealed within the motor by a shield member that acts to reduce evaporation and contain the oil during a shock event. For example, an annular shaped shield member may be placed adjacent to the capillary seal and reservoir to at least partially seal and protect the capillary seal and reservoir from evaporation or leakage of fluid. Typically, such fluid reservoirs are filled via a needle, which may be inserted through a fill hole located in the shield. The fill hole in the shield, however, allows for evaporation of the fluid and may allow contaminants to enter, thereby limiting the useful life of the FDB motor. In addition to evaporation, fluid may exit the fill hole during a shock event.

Additionally, during injection of fluid into the system, a needle is threaded through the fill hole of the shield to the fluid reservoir. The needle tip may contact surfaces of the shield not associated with the reservoir, thereby depositing fluid on unintended portions of the shield or motor.

Finally, the shield may be placed in close proximity to relatively rotating portions of the FDB motor system and may contact a relatively rotating portion of the FDB motor during an operational shock event or the like. Such contact may lead to possible damage or seizure of the motor.

Accordingly, systems and methods for providing reduced evaporation or escape of fluid from a fluid reservoir of a fluid dynamic bearing motor system are desired.

SUMMARY

In one aspect, a method for manufacturing a Fluid Dynamic Bearing (FDB) motor having a shield member is provided. In one example, the method includes disposing a first member and a second member for relative rotation about an axis of rotation. An annular shield member is attached to the first member, the shield member disposed adjacent a fluid reservoir for containing a bearing fluid. The fluid reservoir is filled with a fluid through an aperture (e.g., a fill hole) in the shield member. The aperture is then at least partially sealed, thereby shielding the fluid reservoir (e.g., by reducing or preventing evaporation or escape of fluid from the fluid reservoir).

The aperture may be laser welded after the fluid is added to at least partially seal the aperture. Further, a plug may be placed over or within the aperture and fixed in place to seal the aperture. The seal may be a hermetic or vacuum seal.

In another example, a fluid dynamic bearing system is provided that includes a first member and a second member disposed for relative rotation about an axis of rotation. A shield member is fixed to the first member, and a fluid reservoir is disposed between a portion of the shield member and a portion of the second member. The shield member further includes an aperture, wherein the aperture is at least partially sealed.

In another aspect, a method for manufacturing an FDB motor having a two piece shield member is provided. In one example, the method includes disposing a first member and a second member for relative rotation about an axis of rotation. A first shield portion is attached to the first member, wherein a surface of the first shield portion opposes a surface of the second member to form a fluid reservoir therebetween. A bearing fluid is added to the reservoir and a second shield portion is positioned to shield the reservoir.

In another example, a fluid dynamic bearing system is provided that includes a first member and a second member disposed for relative rotation about an axis of rotation. An annular shield is spatially fixed with respect to the first member, the shield including a first portion and a second portion, wherein a fluid reservoir is positioned between a surface of the first portion and a surface of the second member, and the second portion of the shield is positioned to shield the reservoir.

In another aspect, a disk drive is provided. The disk drive includes an FDB motor having an exemplary shield as described herein.

The present invention and its various embodiments are better understood upon consideration of the detailed description below in conjunction with the accompanying drawings and claims.

BRIEF DESCRIPTION OF THE DRAWINGS

For a fuller understanding of aspects and examples disclosed herein, reference is made to the accompanying drawings in the following description.

FIGS. 3a and 3b illustrate side views of exemplary shield members and plugs for sealing the fill hole;

FIGS. 3c-3g illustrate side views of various exemplary plug shapes; and

DETAILED DESCRIPTION

Figure 1:
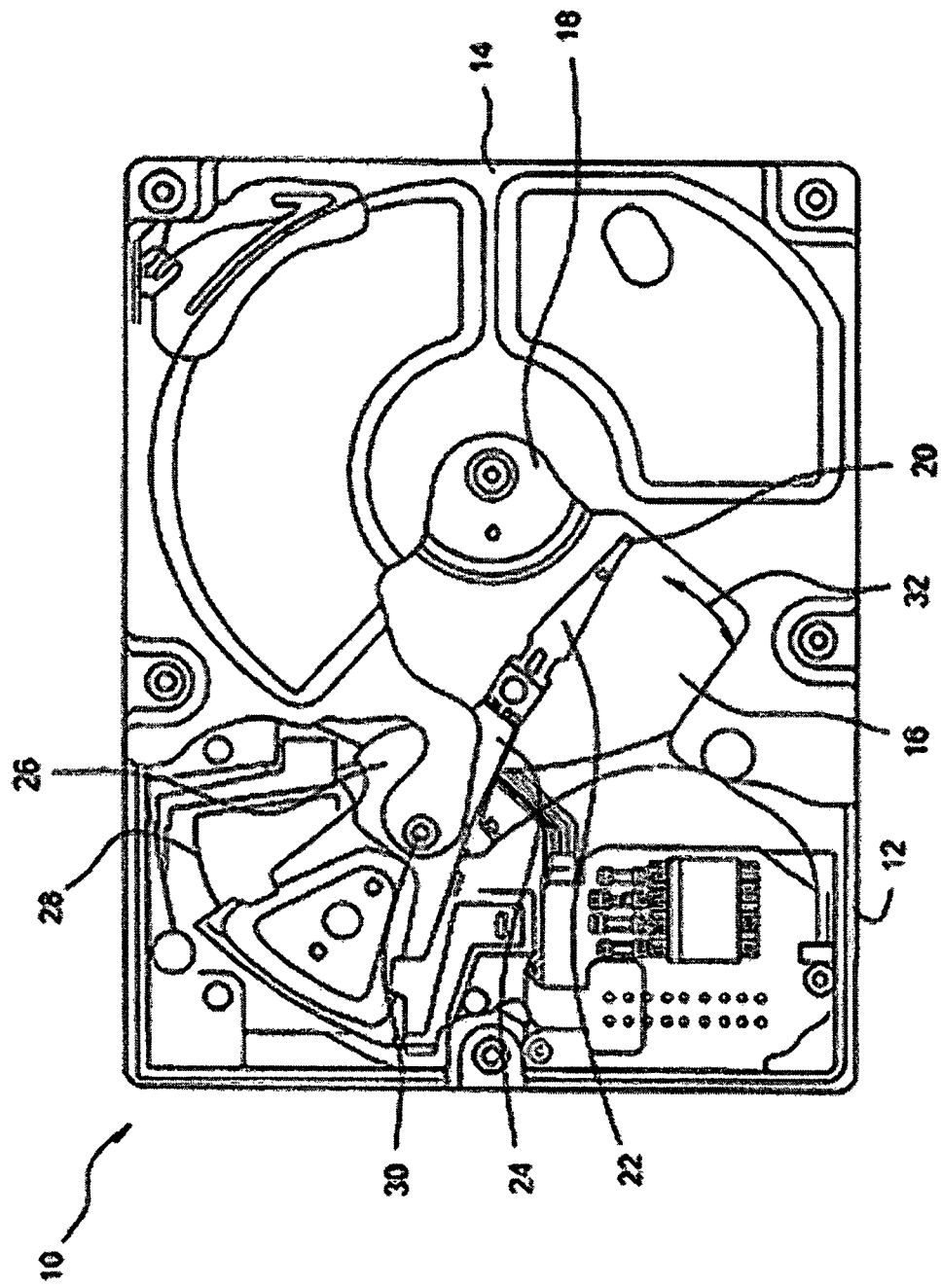
FIG. 1 illustrates a plan view of an exemplary disk drive storage system.

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disk storage drives. Motors for disk storage drives may be designed and may operate in a number of ways. The exemplary motors and other exemplary subject matter provided herein are for illustrating various aspects and are not intended to limit the range of motors and devices in which such examples and aspects may be applied.

In one example described herein, methods and systems for disposing a shield member with a Fluid Dynamic Bearing (FDB) motor are described. The shield member is placed to shield a fluid reservoir and includes an aperture or fill hole for adding fluid to the reservoir. After fluid has been added to the reservoir the fill hole is sealed to prevent or reduce evaporation and escape of fluid through the fill hole. In one example, the fill hole is sealed by a laser weld process. For example, a single laser pulse may be used to melt a plug material disposed adjacent or within the fill hole of the shield member, thereby sealing the fill hole. In one example, the fill hole is hermetically sealed, which may realize lower design and manufacturing cost, improved fluid life, and improved shock performance of an FDB motor.

In another example described herein, methods and systems for including a two piece shield with an FDB motor are provided. As described previously, a conventional shield member is generally welded (or otherwise fixed) to a sleeve portion of the motor and fluid is injected into the fluid reservoir through a fill hole in the shield member. In one example provided herein, the shield includes two portions, a first portion of the shield is fixed (e.g., welded) into place with the motor (e.g., fixed to the sleeve or the like). Fluid is then added to a reservoir portion that may be formed at least partially between the first portion of the shield and an opposing portion of the motor. The fluid is added without having to pass through a fill hole. A second portion of the shield may thereafter be fixed to the first portion of the shield, thereby providing a shield member for the FDB motor (in particular, to the oil reservoir) that does not include a fill hole or other aperture in the shield member. Further, the two portions of the shield may include two different materials, and may be optimized for different characteristics. In one example, the second portion further acts as an axial limiter for the motor and the material of the second portion may be optimized for suitable wear characteristics or the like.

Generally, exemplary shield members described herein, whether including a sealed fill hole or a two piece design, are intended to reduce or prevent evaporation and escape of the fluid in the FDB reservoir. The reduction in evaporation or escape of fluid may increase the life and performance of the FDB motor.

Turning briefly to FIG. 1, a plan view of an exemplary disk drive 10 for use with various aspects described herein is shown. The disk drive 10 includes a housing base 12 and a top cover 14. The housing base 12 is combined with top cover 14 to form a sealed environment to protect the internal components from contamination by elements outside the sealed environment. Disk drive 10 further includes a disk pack 16 that is mounted on a hub 202 (see FIG. 2a) for rotation on a spindle motor 200 (see FIG. 2a) by a disk clamp 18. Disk pack 16 includes one or more individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32. The general configuration and arrangement of disk drive 10 shown in FIG. 1 is illustrative only, and other arrangements of the various components have frequently been used, and aspects provided are not limited by the particular configuration of disk drive 10 shown.

Figure 2A:
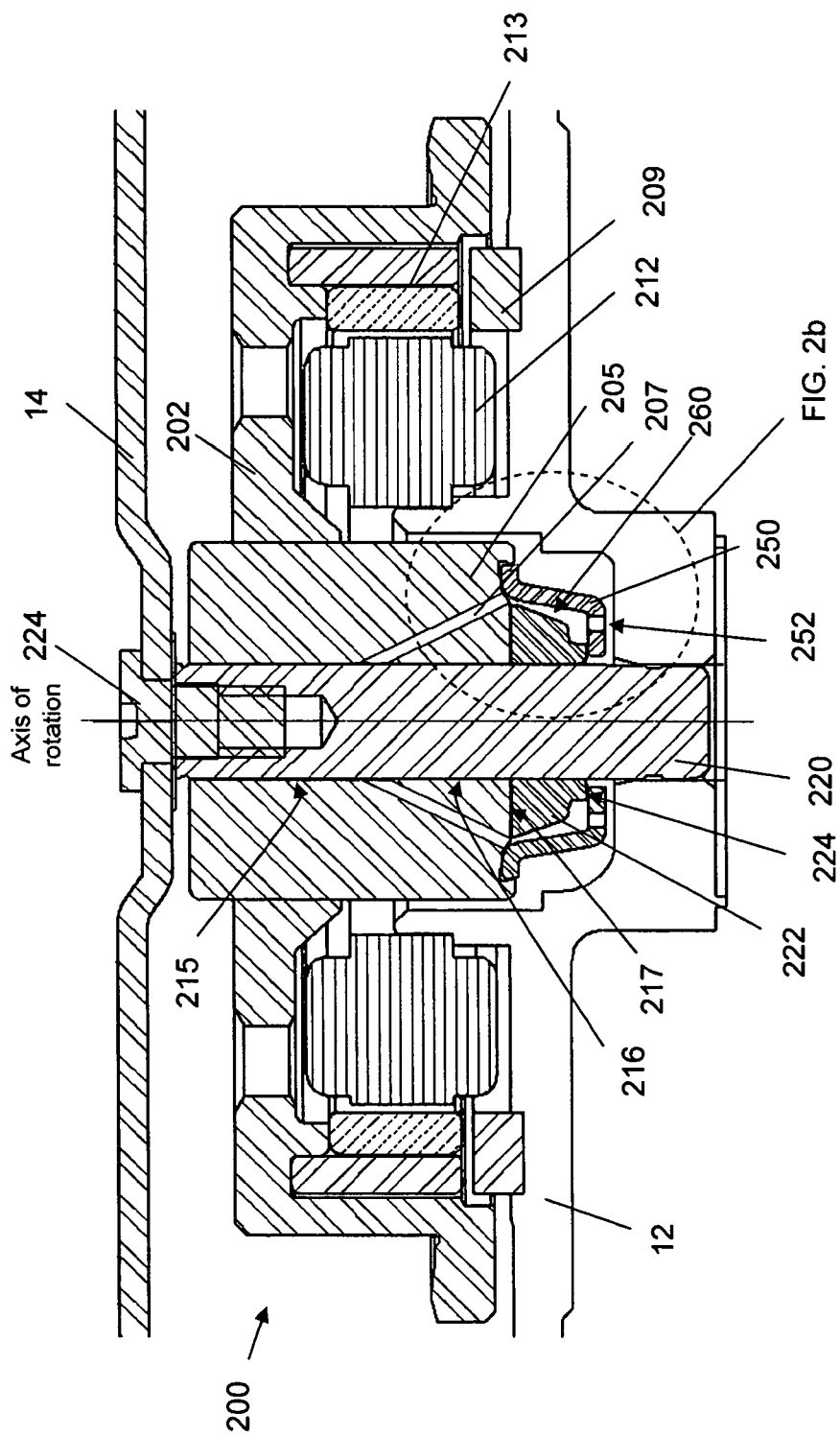
FIGS. 2a and 2b illustrate cross-sectional views of a portion of an FDB motor including a shield member according to one example.
Figure 2C:
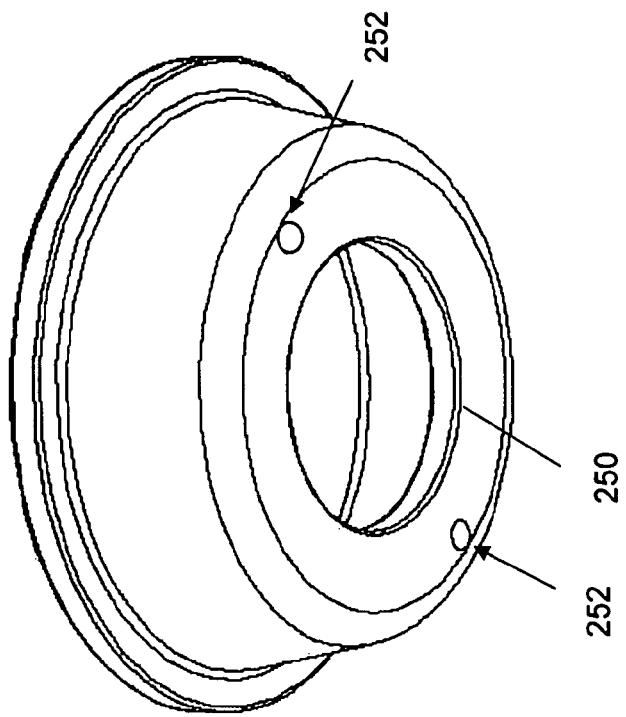
FIG. 2c illustrates a perspective view of an exemplary shield member including a fill hole.
Figure 2B:
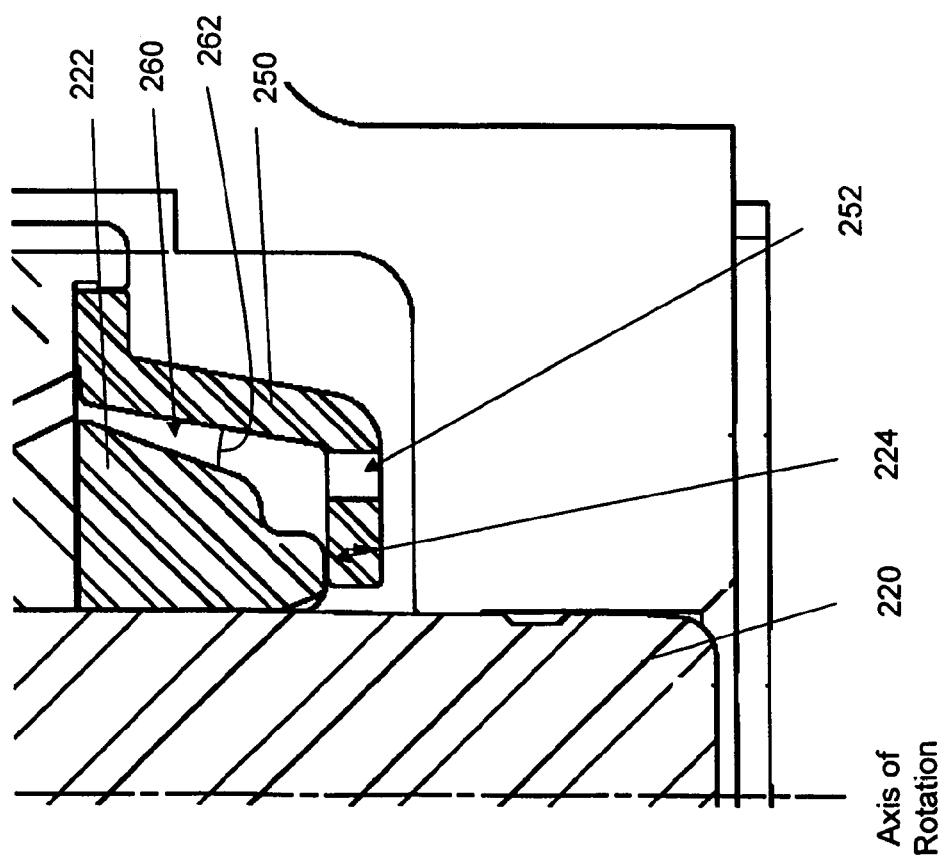

FIGS. 2a-2c illustrate various views of an exemplary shield member 250 according to a first example and are preferably referenced in combination. In particular, FIG. 2a illustrates an exemplary spindle motor 200 including shield member 250, FIG. 2b illustrates a detailed portion of shield member 250 of motor 200, and FIG. 2c illustrates a perspective view of shield member 250, according to one example.

In this example, motor 200 generally includes a stationary shaft portion including shaft 220 and thrust plate 222. Shaft 220 is further fixed at the lower end with base 14 and the upper end by screw support 224. Screw support 224 is further fixed with respect to top cover 14 in a top-cover attached configuration.

Motor 200 further includes a rotor portion rotatably mounted to the shaft portion, the rotor portion generally including sleeve 205 and hub 202 which rotate around stationary shaft 220. An inner radial surface of sleeve 205 and outer radial surface of shaft 220 form a fluid dynamic bearing gap therebetween, where one or both of the radial surfaces may include circumferentially disposed groove regions 215 and 216. Groove region 215 and/or groove region 216 may be asymmetrical and may function as pumping seals and/or to recirculate lubricating liquid through portions of motor 200, e.g., recirculation channel 207. A groove region 217 may further be formed between sleeve 205 and thrust plate 222 to form a thrust bearing, for example.

Mounted with shaft 220 and thrust plate 222 is a stator 212 that, when energized, communicates with a magnet associated with hub 202 and induces rotation of hub 202 and sleeve 205 about stationary shaft 220. Stator 212 comprises a plurality of "teeth" (not shown) formed of a magnetic material where each of the teeth is wound with a winding or wire (not shown).

This particular example includes an electro-magnetic biased motor. In particular, to establish and maintain pressure in the groove region 217, and to bias the rotating assembly, a constant force magnetic circuit may be provided comprising magnet 213 supported on the rotating assembly (here mounted on hub 202), and located across a gap from a magnetically conducting steel ring 209 supported on the stationary assembly. Other magnetic circuits or configurations are of course possible. Such a configuration recognizes many advantages; however, a significant disadvantage to magnetically biased FDB motors of the prior art is that the axial magnetic force may be overcome by a shock event or the like resulting in relative axial displacement of the rotor portion and shaft portion. Accordingly, shield member 250 may further act as an axial limiter to restrict axial displacement of hub 202 relative to shat 220. In particular, a small axial gap 224 defined between the lower edge of shield member 250 and thrust plate 222 may be set to restrict axial movement as desired.

Additionally, a fluid reservoir defined in part by capillary seal 260 is disposed between shield member 250 and a portion of motor 200, in this example, a portion of thrust plate 222. As illustrated more clearly FIG. 2b, the distance between the outer radial surface of thrust plate 222 and the inner radial surface of shield member 250 varies from a narrow gap distance proximate circulation channel 207 and the bearing regions to a wide gap distance distal therefrom, forming capillary seal 260 therebetween. FIG. 2b further shows fluid between shield member 250 and thrust plate 222 forming a meniscus 262. In this configuration, capillary forces on liquid within capillary seal 260 will draw liquid toward bearing regions of motor 200. Additionally, capillary seal 260 serves as a fluid reservoir of lubricating liquid for bearings 215, 216, and 217, for example.

In this example, capillary seal 260 is disposed in series (e.g., at similar radial distances and varying axial positions) with sleeve 205, but may also be disposed in parallel (e.g., at similar axial positions but varying radial distances), which may reduce the overall height (along the axis of rotation) of motor 200. Further, this particular example may increase the volume of fluid reservoir in the motor 200. Those of ordinary skill in the art will recognize, however, that various other designs and configurations of capillary seal 260 and fluid reservoirs are possible (whether used in conjunction with shield member 250 or otherwise).

FIG. 2c illustrates a perspective view of exemplary shield member 250. In this example, shield member 250 includes an annular shaped member having two fill holes 252. In other examples, one or more fill holes 252 are possible. Additionally, in other examples, various other annular shapes and designs are possible. For example, the cross-sectional shape, as seen in FIGS. 2a and 2b, may include one or more ridges, shoulders, curves, and the like, forming L or S shaped cross-sections, for example. Additionally, shield member 250 may include conical portions and may be fixed with respect to other portions of the motor such as shaft 220 or the like. Further, shield member 250 may be formed integral with various portions of the motor such as sleeve 205, or the like.

In one aspect described herein, a method for manufacturing an FDB motor such as motor 200 includes disposing shield member 250 with an FDB motor, such as motor 200, adding fluid through fill hole 252 into the fluid reservoir of the motor, and sealing fill hole 252 after the fluid has been added. In particular, shield member 250 may be fixed to a motor portion, e.g., sleeve 205, by any suitable method. Fluid may then be added through one or more fill holes 252 into the reservoir, e.g., formed in part by capillary seat 260. Fill holes 252 may then be partially or completely sealed to reduce or prevent the loss of fluid.

In one example, fill hole 252 is sealed by heating a selective portion of shield member 250 to melt and reflow base material (e.g., steel or other suitable material) of shield member 250 into fill hole 252. For example, a laser source may direct one or more pulses to a portion of shield member 250 adjacent fill hole 252 to locally heat and melt material of shield member 250 surrounding hole 252 such that the material melts and flows within or over fill hole 252. In one example, shield member 250 may be manufactured with excess material in the vicinity of fill hole 252, e.g., a ridge or the like around fill hole 252, such that upon heating there is sufficient material to reflow and fill hole 252.

In another example, a fill material or plug member is placed in or adjacent fill hole 252 and fixed in place to at least partially seal fill hole 252. For example, a wire may be fed partially into or through fill hole 252 and a laser pulse directed to a portion of the wire in or adjacent fill hole 252 with sufficient power, duration, etc., to fuse a portion of the wire to shield member 250. In one example, a single laser pulse having characteristics in the range of 3.7-4.0 ms, 300-400 v, and 2.5-4 j is used to weld a plug member such as a wire or the like within fill hole 252. The wire may then be trimmed back after fill hole 252 is sealed. The wire may be comprised of the same or different materials than shield member 250, and the wire may have a diameter or cross-sectional shape similar to fill hole 252. For example, the diameter of fill hole 250 may be between 0.3 and 0.5 mm and a wire having a similar diameter of between 0.3 and 0.5 mm may be used.

FIGS. 3a and 3b illustrate exemplary plugs 354a and 354b over and/or within fill hole 352a and 352b, which may be then fixed in place to at least partially seal fill hole 352a and 352b respectively. With respect to FIG. 3a, an exemplary ball shaped plug 354a is placed over a cylindrical shaped fill hole 352a. Plug 354a may then be fixed in place to seal fill hole 352a. In one example, a laser pulse as described above may be used to heat and weld plug 354a over hole 352a, for example, such that plug 354a melts and covers or fills fill hole 352a. In other examples, plug 354a may be epoxy bonded, press fitted, or otherwise fixed in place with respect to fill hole 352a.

With respect to FIG. 3b, an exemplary flush rivet shaped plug 354b is placed within a corresponding shaped fill hole 352b. In one example, a laser pulse is used to heat and weld plug 354b in place, within fill hole 352b. In other examples, plug 354b could be epoxy bonded, press fitted, or otherwise fixed in place with respect to fill hole 352b. The flush rivet shaped plug 354b and corresponding hole 352b may provide relative smooth surfaces on the upper and lower portion of shield 350.

FIGS. 3c-3g illustrate various exemplary shaped plugs 354a-d that may be placed within or over a fill hole as described. The shape of the corresponding fill hole may also include various exemplary shapes to accommodate the different plug shapes. For example, various shapes including cylindrical, rivet, wedge, plate, annular shim, or the like may be used for the plug, fill hole 352, or both. Plug material may be bonded via welding, laser welding, epoxy bonding, or otherwise fixed in place, as well as pressed to form a friction fit within hole 352. Further, plug material may include the same or different material than shield member 350.

After a fill hole has been sealed adequately, further processing may be desired to remove excess material from the surfaces of the shield member that may cause undesirable surface relief features, for example, a bump or ridge. In one example, an additional laser pulse (or pulses) is used to melt or ablate undesirable surface relief features. Such subsequent laser pulse(s) may include a larger spot diameter, for example, to melt and reflow the excess material. Additionally, various mechanical or chemical polishing processing and the like may be used to remove excess material.

Figure 4:
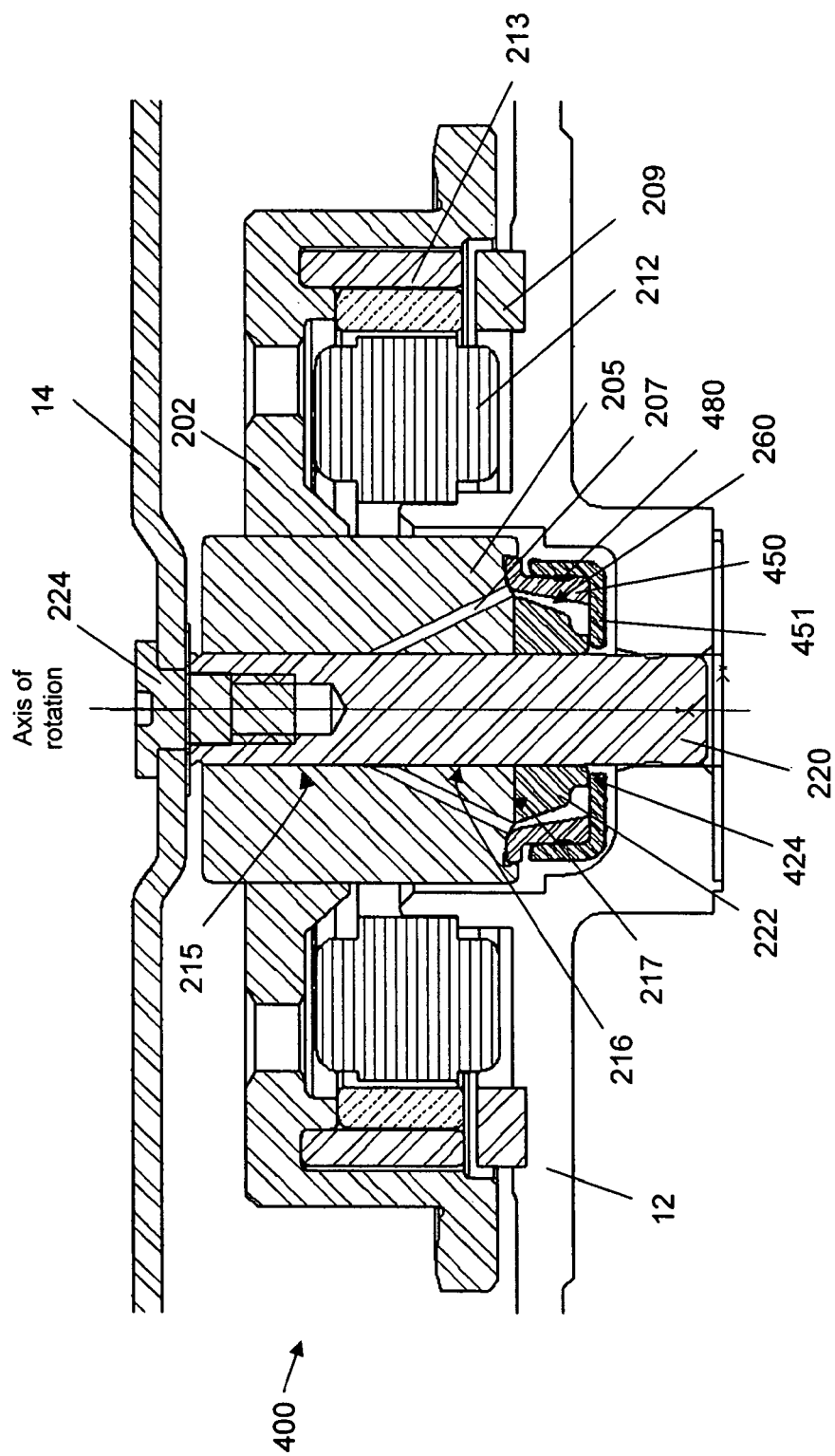
FIG. 4 illustrates a cross-sectional view of a portion of an FDB motor including a two piece shield according to another example.

With reference to FIG. 4, a cross-sectional view of an exemplary motor 400 including a two piece shield according to another aspect provided herein is illustrated. Motor 400 is similar to motor 200; accordingly, only differences will be discussed in detail. In particular, shield member 250 as illustrated in FIGS. 2a-2c is replaced with a two piece shield member including a first portion, reservoir shield 450, and a second portion, shield 451.

In one example, a two piece shield member configuration allows for a first portion, reservoir shield 450, to be fixed to a portion of the motor and disposed to define a portion of a fluid reservoir and capillary seal 260. Fluid may then be added to the reservoir and capillary seal 260 directly without passing through a fill hole as described previously and held between reservoir shield 450 and a portion of thrust plate 222, at least partially, by capillary forces. A second portion of the shield member, shield 451, may then be fixed to the first portion, reservoir shield 450, thereby defining a shield member similar to that of shield member 250.

Reservoir shield 450 may be mounted, for example, by press fitting or epoxy bonding reservoir shield 450 into an annular ridge or shoulder portion of sleeve 205. Additionally, reservoir shield 450 may be formed integral with sleeve 205, or other portion spatially fixed with respect to shield 451, e.g., a surface opposing thrust plate 222 may simply be formed as part of a motor element and placed in opposition with an opposing surface to form capillary seal 260 and fluid reservoir therebetween. In other examples, reservoir shield 450 may be similarly fixed with respect to the rotor, e.g., fixed to a rotating portion of the motor, and configured to form a capillary seal/reservoir between an opposing surface associated with a stationary portion of the motor.

Shield 451 may be fixed to reservoir shield 450 by adhesive 480, for example. Reservoir shield 451 and shield 451 may be attached by any suitable method including, but not limited to welding, epoxy boding, press fitting, and the like. Additionally, the cross-sectional shapes of reservoir shield 450 and shield 451 may vary similarly as discussed above for shield member 250.

In one example, reservoir shield 450 and shield 451 include different materials. For example, in instances where shield 451 provides an axial limited for motor 400, shield 451 may include different materials, coatings, etc. to improve the wear characteristics relative to reservoir shield 450. In particular, shield 451 may include materials suited for contacting a relatively rotating, opposing surface of thrust plate 222 across gap 424 during an axial displacement.

Various motor and FDB aspects have been illustrated and described herein. It should be recognized that exemplary spindle motor 200 and motor 400 are shown for illustrative purposes only and other motor designs are contemplated and possible for use with exemplary aspects described. For example, U.S. Pat. Nos. 6,154,339 and 6,828,709, and U.S. patent application Ser. No. 10/600,096, all of which are hereby incorporated by reference as if fully set forth herein, describe additional motor configurations that may be used with various aspects described herein. Also, it would be understood that certain components have been separately identified herein, but such identification does not imply that such components must be separately formed from other components. Similarly, components identified herein may be sub-divided into sub-components in other designs. Additionally, illustrated features such as recirculation channels, bearing surfaces, pumping grooves, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various FDB and capillary seal systems and methods. Additionally, particular examples have been discussed and how these examples are thought to address certain disadvantages in related art. This discussion is not meant, however, to restrict the various examples to methods and/or systems that actually address or solve the disadvantages.

We claim:

1. An apparatus comprising:
a first member and a second member; and
a shield member coupled to a rotatable sleeve, wherein an edge of said shield member is configured to restrict axial movement of said first member with respect to said second member,
said shield member comprises an aperture for receiving fluid, and said aperture is further configured to be sealed subsequent to receiving said fluid, and further defines a fluid reservoir configured to store said fluid.

2. The apparatus of claim 1 further including a means for plugging said aperture, wherein said means for plugging is structurally disposed on said aperture, and wherein said means for plugging is configured to at least partially seal said aperture.

3. The apparatus of claim 2, wherein said means for plugging is welded to said shield member.

4. The apparatus of claim 2, wherein said means for plugging is configured to be melted and at least partially seal said aperture in response to application of heat.

5. The apparatus of claim 1, wherein a shape of said aperture is selected from a group consisting of cylindrical shape, rivet shape, edge shape, plate shape, and annular shape.

6. The apparatus of claim 1, wherein said shield member comprises a conical portion.

7. The apparatus of claim 1, wherein said shield member is integrated with a portion of said rotatable sleeve.

8. The apparatus of claim 1, wherein said aperture is at least partially sealed with a melted wire.

9. The apparatus of claim 1 wherein said fluid reservoir is defined between said shield member and said second member.

10. An apparatus comprising:
   a first member, a second member, a fixed shaft, and a rotatable sleeve; and
   a shield member coupled to said rotatable sleeve, wherein said shield member includes a first portion and a second portion, said second portion is configured to be fixed to said first portion after said first portion receives a fluid, and said first portion and said second portion form a fluid reservoir configured to contain said fluid.

11. The apparatus of claim 10, wherein said first portion and said second portion comprise different materials.

12. The apparatus of claim 10, wherein a radial surface of said first portion of said shield member opposes a radial surface of said second member in a tapered fashion to form a capillary seal for directing said fluid toward a bearing section, and wherein a radial surface of said second portion of said shield member is proximate to said radial surface of said second member.

13. The apparatus of claim 10, wherein an edge of said shield member forms a gap with respect to said second member, said edge is configured to restrict axial movement of said first member with respect to said second member, and said first portion is fixed to a portion of said second member forming a portion of said fluid reservoir for receiving fluid.

14. The apparatus of claim 10, wherein said shield member is aperture free.

15. The apparatus of claim 10, wherein said first portion is press fixed to said second member or said first portion is epoxy bonded to an annular ridge of said second member.

16. An apparatus comprising:
   a rotatable shield member coupled to a motor and comprising a fluid seal, wherein an edge of a first shield portion of the rotatable shield member is configured to restrict axial movement of a first motor member with respect to a second motor member, and wherein the rotatable shield member further comprises a second shield portion, such that said first and second shield portions form a fluid reservoir configured to store a fluid.

17. The apparatus of claim 16, wherein said second shield portion and said first shield portion include different materials, and wherein a radial surface of said second portion of said rotatable shield member is proximate to the second motor member.

18. The apparatus of claim 1, wherein said first member is a hub and said second member is a thrust plate or a shaft.

19. The apparatus of claim 10, wherein said first member is a hub and said second member is a thrust plate.

20. The apparatus of claim 16, wherein said first member is a hub and said second member is a thrust plate or a shaft.

* * * * *